UNITED STATES PATENT OFFICE.

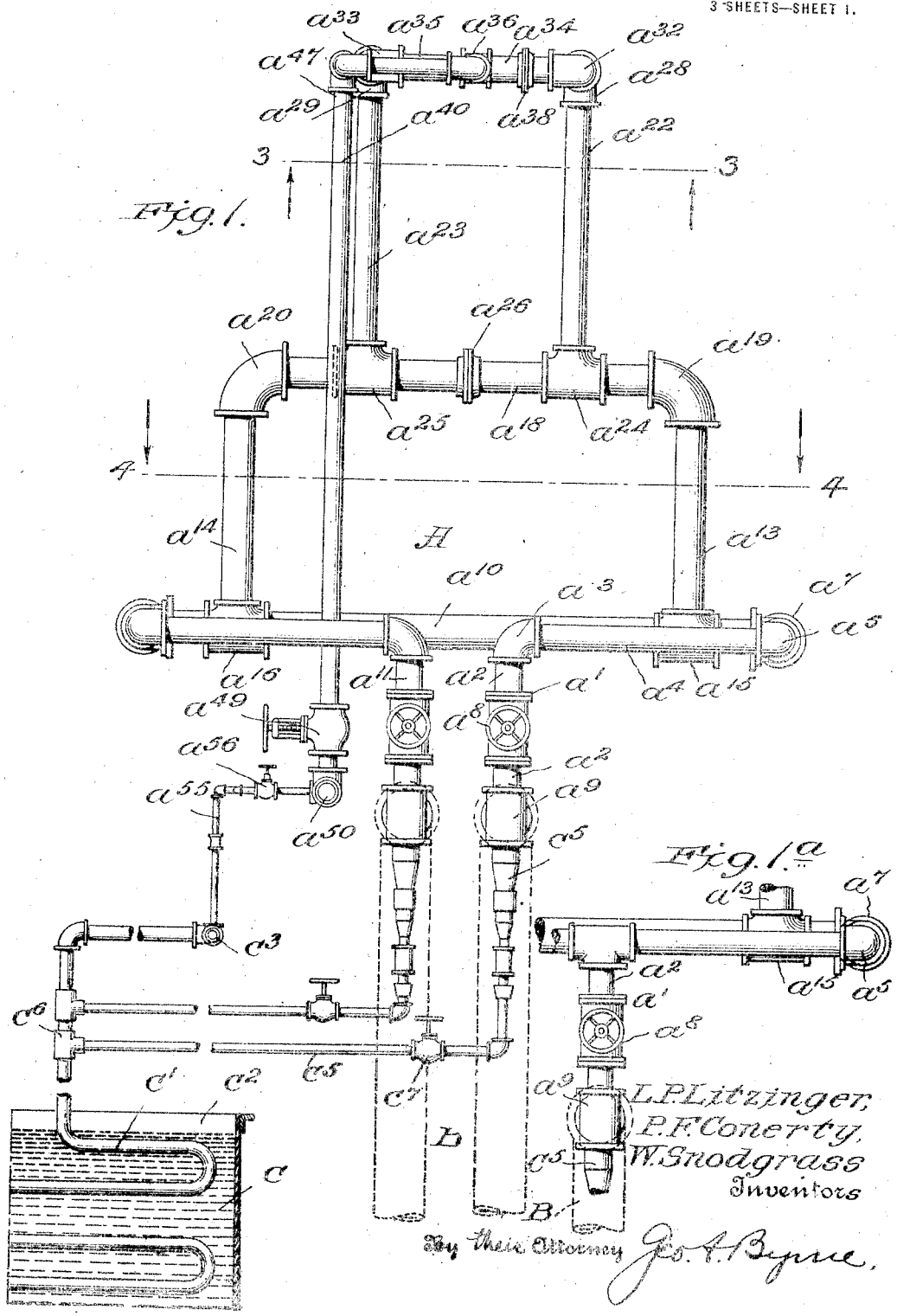

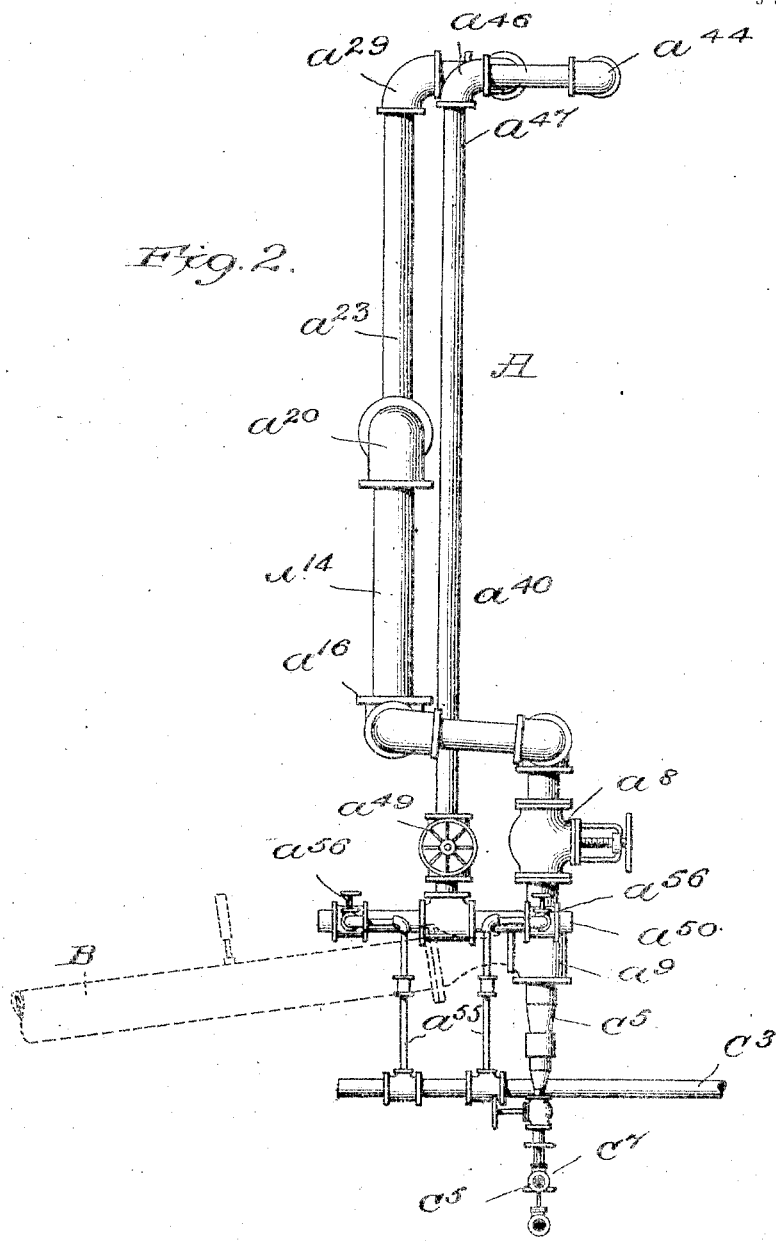

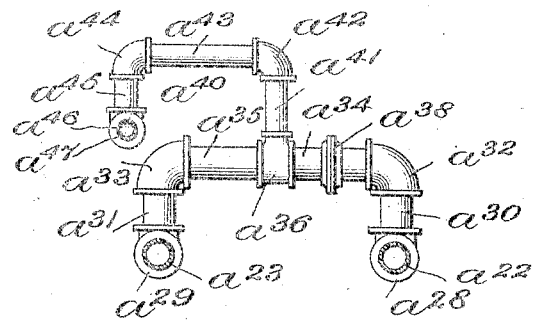
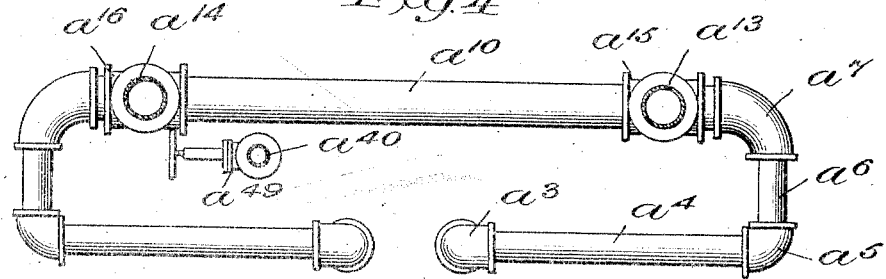
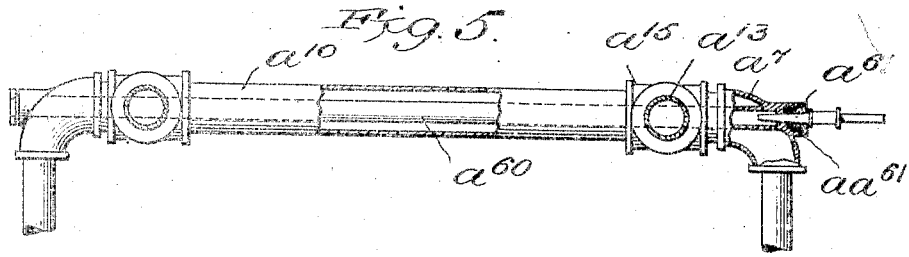
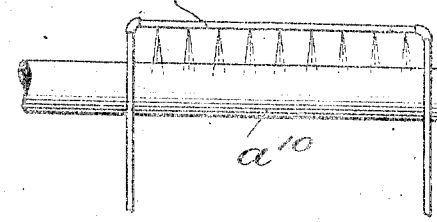

LEWIS P. LITZINGER AND PATRICK F. CONERTY, OF BUTLER, AND WILLIAM SNODGRASS, OF BRUIN, PENNSYLVANIA.

AERIAL CONDENSER.

1,349,681.

Specification of Letters Patent.   Patented Aug. 17, 1920.

Application filed June 19, 1919.   Serial No. 305,387.

*To all whom it may concern:*

Be it known that we, LEWIS P. LITZINGER, PATRICK F. CONERTY, and WILLIAM SNODGRASS, all citizens of the United States, residing at Butler, Penna., Butler, Penna., and Bruin, Pa., respectively, in the county of Butler, Pa., have invented certain new and useful Improvements in Aerial Condensers, of which the following is a specification.

This invention relates to improvements in aerial or air-cooled condensers of the type commonly employed in conjunction with oil stills for effecting a separation of the heavy vapors from the lighter vapors, and sometimes known as a fractionator.

The invention provides an air condenser which is compact, easily constructed and erected, all the materials of which are stock materials, readily procured, which stands up detached from the still in such a manner as not to hamper access to the still and its parts for purposes of cleaning and repair, and in such a manner as to diminish the chances of vapors which may accidently escape from the condenser catching fire from the still.

The invention further provides an air condenser wherein the dephlegmation or separation of the volatile gases or vapors is more effectively accomplished than heretofore, by retarding the rapidity of circulation and effecting an expansion of the vapors, thereby providing a condensate whose constituents are all of a like or similar boiling point.

Moreover the action of the condenser is practically regular and uniform, resulting in the advantage of a more regular and uniform firing or heating of the stills, and less wear and tear on the entire still system.

The invention further provides a condenser which is easily and readily controlled, thereby enabling a large number of stills and condensers to be controlled by a single attendant.

The invention further provides a condenser adapted to receive vapors under considerable pressure and permitting of the vapors being discharged at a comparatively low and uniform pressure into a subsequent condenser where the vapors which have undergone separation in the present condenser (or fractionator) are condensed to liquid form, thereby resulting in a very even and constant flow of liquid at the end of the system.

The invention further provides for cutting off the vapors coming from the still from the aerial condenser, as in case of an accident to the condenser, and leading the said vapors to the liquefying condenser or condensers by another route, thereby relieving the still.

The invention further resides in certain specific and novel combinations and arrangements of parts particularly set forth in the detailed description which follows, and defined in the appended claims.

The preferred embodiment of the invention is illustrated in the accompanying drawings, together with certain modifications or parts thereof.

The invention will be more fully explained and ascertained in and by the following detailed description, particular reference being made therein to the drawings.

In said drawings:—

Figure 1 is a view in elevation of said embodiment of the invention, showing a part of the vapor lines leading off from the still and the water condenser for liquefying the vapors passing over from the aerial condenser or fractionating device.

Fig. 1ª shows a modification wherein the aerial condenser is connected to a single vapor line.

Fig. 2 is a side elevation of the principal parts shown in Fig. 1.

Fig. 3 is a cross-section on the line 3—3 of Fig. 1 looking up.

Fig. 4 is a cross-section on the line 4—4 of Fig. 1 looking down.

Fig. 5 is a view of a modification; and

Fig. 6 is a similar view of another modification.

Referring to said drawings, A designates the aerial condenser, B a part of the vapor lines leading off from a still; and C a liquefying condenser.

Vapors from the still enter the condenser A through a leading-in pipe $a^1$, which communicates with one end of a horizontal expansion chamber $a^{10}$, conveniently in the form of a section of pipe of larger diameter than the leading-in pipe $a^1$, the leading-in pipe $a^1$ conveniently comprises short sections or nipples $a^2$ $a^2$, and L-fitting $a^3$, a horizontal pipe section $a^4$, an L-fitting $a^5$ and a short section $a^6$, the leading-in pipe and the horizontal expansion chamber or pipe are connected by a reducing L-fitting $a^7$. A gate valve $a^8$ is placed between the nipples $a^2$ $a^2$ in the leading-in pipe. The end of the vapor line B is preferably provided with a T-fitting $a^9$, to one branch of which the nipple $a^2$ is joined. The opposite end of the horizontal expansion chamber $a^{10}$ is connected with a leading-in pipe $a^{11}$ from another vapor pipe similar to the leading in pipe $a^1$. Where the condenser is connected to a single vapor line, the parts $a^2$ and $a^8$ of one of the leading-in pipes will be omitted and a T-fitting substituted for the L-fitting $a^3$ and this section $a^4$ and its counterpart connected to said T-fitting, as shown in Fig. 1a. In either case, the vapors will be lead into the expansion chamber $a^{10}$ from each end.

Somewhat inward from its ends, the expansion chamber or pipe $a^{10}$ is connected with risers $a^{13}$ $a^{14}$, which latter are preferably sections of pipe of the same diameter as the pipe $a^{10}$ and connected to said pipe $a^{10}$ by T-fittings $a^{15}$ and $a^{16}$.

The risers $a^{13}$ $a^{14}$ are connected at the ends of another horizontal expansion chamber or pipe $a^{18}$, preferably by means of L-fittings $a^{19}$ and $a^{20}$.

The horizontal expansion pipe $a^{18}$, somewhat inwardly of its ends, may be, and preferably is, connected with another pair of vertical risers $a^{22}$ $a^{23}$. The risers $a^{22}$ $a^{23}$ are preferably sections of pipe of smaller diameter than the pipe $a^{18}$ and connected thereto by T-fittings $a^{24}$, $a^{25}$. For convenience in setting up, a union $a^{26}$ is preferably provided in the pipe $a^{18}$.

The risers $a^{22}$, $a^{23}$ are preferably brought together into a single leading-off pipe or conduit $a^{40}$ through L-fittings $a^{28}$ $a^{29}$, short pipes $a^{30}$, $a^{31}$, L-fittings $a^{32}$, $a^{33}$, pipes $a^{34}$, $a^{35}$, and a T-fitting $a^{36}$. For convenience in setting up, a union $a^{38}$ may be provided in the pipe $a^{34}$. The leading-off pipe is preferably of smaller diameter than the risers $a^{22}$, $a^{23}$, and horizontal pipes $a^{34}$, $a^{35}$.

The succession of horizontal expansion chambers and vertical risers similar to $a^{10}$, $a^{18}$, $a^{13}$, $a^{14}$, $a^{22}$, $a^{23}$ may be continued, if desired.

The leading-off pipe $a^{40}$ runs off and down from the T-fitting $a^{36}$ to a header $a^{50}$. The leading-off pipe $a^{40}$ may be made up of a short pipe $a^{41}$, L-fitting $a^{42}$, short pipe $a^{43}$, L-fitting $a^{44}$, nipple $a^{45}$, L-fitting $a^{46}$, and down pipe $a^{47}$.

The leading-off pipe $a^{40}$ is preferably provided with a gate valve $a^{49}$, whereby the aerial condenser to which the leading-off pipe is connected, in conjunction with the valve, or valves $a^8$, may be isolated from the vapor line and from the header $a^{50}$.

The liquefying condenser C comprises a coil or worm C' and preferably a tank $C^2$ containing water for cooling the coil C'. The coil C' preferably connects with a main or pipe $C^3$ which runs close to the header $a^{50}$, of the fractionating condenser, or to the plurality of headers, where there are a battery of fractionating condensers.

The header $a^{50}$ is connected to the main $C^3$ of the liquefying condenser by one or more small pipes $a^{55}$, each of which is controlled by a valve $a^{56}$.

In order to provide a relief for the still in case it is necessary to cut off the fractionating condenser for any purpose, a by-pass pipe $C^5$ is provided between the still and liquefying condenser, one end being connected to the T-fitting or fittings $a^9$ and the other end is connected to the coil C', as by a T-fitting $C^6$. A valve $C^7$ normally closes the passage through the pipe $C^5$.

The still is charged with either high or low boiling point hydrocarbons, such as petroleum distillates and residues, and is adapted to be operated under atmospheric pressure and at high pressures, and the heat may be supplied by steam or direct heat. The vapors issuing from the oils in the still flow out through the vapor line or lines of the still, a part of which is indicated at B.

From the vapor line or lines the vapors pass upward and enter the ends of the horizontal pipe or expansion chamber $a^{10}$ via the leading-in pipes $a^1$, $a^{11}$. Here a fractionation or separation of the vapors takes place, the heavier and less volatile vapors condense, while the lighter and more volatile vapors pass upward into the risers $a^{13}$. The condensed vapors run back into the still where they are again fractionated or broken up into lighter vapors before passing again through the vapor lines and into the aerial condenser. The expansion chamber $a^{10}$ is preferably of larger diameter than the leading-in pipes so that a reduction in temperature of the vapors occurs by reason of the lesser rapidity of circulation and their expansion.

The vapors rising in the risers $a^{13}$, $a^{14}$ flow in at both ends of the horizontal expansion chamber $a^{18}$, where a separation similar to that in the horizontal expansion chamber $a^{10}$ takes place, the heavier and less volatile vapors condensing, and the lighter and more volatile vapors continuing to rise through the risers $a^{22}$, $a^{23}$. The condensed vapors may run back, as heretofore.

The vapors in the risers $a^{22}$, $a^{23}$ again flow into the two ends of another horizontal expansion chamber $a^{34}$, where a separation of the lighter and heavier vapors takes place, as heretofore, and the sequence may be carried farther, if desired.

From the last horizontal expansion chamber the uncondensed vapors pass by way of the leading-off pipe $a^{40}$ to the header $a^{50}$, from whence they are allowed to flow into the liquefying condenser coil C' via the pipe $a^{55}$ and main $C^3$. The valves $a^{56}$ are operated to regulate the flow of the vapors into the liquefying condenser, and ordinarily serve as the only valves requiring manipulation in order to control the flow from the aerial condenser. By restricting the escape of the vapors through the pipe $a^{55}$, the higher pressures may be confined to the fractionating condenser, which is ordinarily high in the air where escape of vapors is attended with least consequences. Moreover, by leading off the vapors through a pipe which is much smaller than the leading-off pipe $a^{40}$ and the pipes of the fractionating condenser, the flow or convection of the vapors through the fractionating condenser is slow, and hence the lighter vapors are less liable to carry along with them by the heavier vapors, and hence conduces to a better fractionation of the vapors.

As explained above, in case it is necessary during a run to cut off one of the fractionating condensers, this may be done by closing the valve or valves $a^8$ and opening the valve or valves $C^7$, allowing the vapors to escape through the bypass $C^5$ into the liquefying condenser C.

If it is desired to provide a more rapid cooling of the vapors than is afforded by the expansion chamber $a^{10}$ or $a^{18}$, this may be done by running a pipe $a^{60}$, through the pipe $a^{10}$, for example, and directing, if desired, a flow of cooling fluid or atmosphere through said pipe $a^{60}$, as by means of a nozzle $a^{61}$ and a stuffing box connection $aa^{61}$, Fig. 5. Or, the same effect may be obtained by arranging a spray $a^{70}$ over the pipe or chamber $a^{10}$, from which a cooling fluid or atmosphere may be sprayed.

It will be observed that by arranging the cooling devices $a^{60}$, $a^{70}$, in conjunction with the horizontal expansion pipes or chambers, the condensation is mainly practised on the heavier vapor, the lighter vapors which it is desired to separate and recover as the final product being principally unaffected by the extra cooling means.

While we have shown and described a particular form of the invention, it is to be understood that the invention is not restricted thereto, as many changes and modifications may be made therein, without departing from the spirit of the invention.

What is claimed is—

1. In a fractionating apparatus the combination of a circuitous pipe length disposed horizontally and providing an expansion chamber, means for connecting the opposite ends of said piping to communicate with a still, a second horizontal piping located above said first named piping and communicating therewith at its respective ends and providing a second expansion chamber, a third horizontal piping located above said second piping and communicating therewith at its respective ends and providing a third expansion chamber, a condenser, and independent and separately controlled pipings connecting said first and third expansion chambers to communicate with the condenser, substantially as set forth.

2. In a fractionating apparatus the combination of a pipe providing an expansion chamber, means for connecting the opposite ends of said pipe to communicate with a still, a second pipe located above said first named pipe and communicating therewith at its respective ends and providing a second expansion chamber, a third pipe located above said second pipe and communicating therewith at its respective ends and providing a third expansion chamber, a condenser, and independent and separately controlled pipings connecting said first and third expansion chambers to communicate with the condenser, substantially as set forth.

3. In a fractionating apparatus the combination of a plurality of laterally disposed and superposed receivers providing expansion chambers of relatively different capacities, pipes connecting said receivers to communicate in series, a pipe connecting the lowermost of said receivers with a still, a condenser, and independent and separately controlled communicating connections between the lower-most and upper-most of said receivers respectively with the condenser, substantially as set forth.

In testimony whereof, we have signed our names to this specification in the presence of two subscribing witnesses, this tenth day of June 1919.

LEWIS P. LITZINGER.
P. F. CONERTY.
WILLIAM SNODGRASS.

Witnesses:
S. A. LUGIBIHE, Jr.,
C. R. HALLERAN.